(12) United States Patent
Lecostaouec

(10) Patent No.: US 8,752,255 B2
(45) Date of Patent: Jun. 17, 2014

(54) SYSTEM AND METHOD FOR TEXTILE POSITIONING

(71) Applicant: Goodrich Corporation, Charlotte, NC (US)

(72) Inventor: Jean-Francois Lecostaouec, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 13/888,097

(22) Filed: May 6, 2013

(65) Prior Publication Data

US 2013/0239376 A1    Sep. 19, 2013

Related U.S. Application Data

(62) Division of application No. 12/774,119, filed on May 5, 2010, now abandoned.

(51) Int. Cl.
*D04H 3/05* (2006.01)
*D04H 3/10* (2012.01)

(52) U.S. Cl.
USPC ............................................. 28/107; 28/170

(58) Field of Classification Search
USPC ........... 28/107–115, 170, 171, 165, 168, 158; 139/11, 457–459, 302, 384 R, 386, 139/420 R
See application file for complete search history.

(56) References Cited

U.S. PATENT DOCUMENTS

| | | | |
|---|---|---|---|
| 5,609,707 A * | 3/1997 | Bazshushtari et al. ........ 156/148 |
| 5,758,394 A | 6/1998 | Linck et al. |
| 5,952,075 A | 9/1999 | Clarke et al. |
| 6,009,605 A | 1/2000 | Olry et al. |
| 6,105,223 A | 8/2000 | Brown et al. |
| 6,183,583 B1 * | 2/2001 | Duval et al. .................... 156/148 |
| 6,248,417 B1 | 6/2001 | Ponsolle et al. |
| 6,319,348 B1 | 11/2001 | Olry et al. |
| 6,347,440 B1 | 2/2002 | Duval et al. |
| 6,363,593 B1 | 4/2002 | Duval et al. |

(Continued)

FOREIGN PATENT DOCUMENTS

| | | |
|---|---|---|
| FR | 2643656 | 8/1990 |
| WO | WO2007048946 | 5/2007 |

OTHER PUBLICATIONS

Office Action dated Aug. 24, 2012 in U.S. Appl. No. 12/774,119.
Office Action dated Feb. 4, 2013 in U.S. Appl. No. 12/774,119.

(Continued)

*Primary Examiner* — Amy Vanatta
(74) *Attorney, Agent, or Firm* — Snell & Wilmer L.L.P.

(57) ABSTRACT

In various embodiments, the present disclosure relates generally to a method for needling a spiral textile to create a needled preform, the method comprising receiving the spiral textile on a bed plate of a circular needle loom, engaging a positional structure of the spiral textile, rotating the spiral textile around the circular needle loom, depositing a predetermined number of layers of the spiral textile on the bed plate, and needling the spiral textile to create the needled preform. Moreover, the present disclosure also provides, in various embodiments, a method for creating a circular needled preform from a spiral textile, comprising attaching sacrificial fibers to at least one of the weft tow and the plurality of warp tows proximate at least one of the inside diameter and the outside diameter, and engaging the sacrificial fibers with an engagement mechanism on a circular needle loom.

7 Claims, 23 Drawing Sheets

(56) References Cited

U.S. PATENT DOCUMENTS

| | | |
|---|---|---|
| 6,367,130 B1 | 4/2002 | Duval et al. |
| 7,185,404 B2 | 3/2007 | Delecroix |
| 7,251,871 B2 | 8/2007 | Delecroix |
| 8,448,310 B2 * | 5/2013 | Vincent ............ 28/107 |
| 2005/0172465 A1 * | 8/2005 | Duval ............ 28/101 |
| 2006/0090314 A1 | 5/2006 | Delecroix |
| 2011/0154628 A1 * | 6/2011 | Vincent et al. ............ 28/107 |
| 2011/0154629 A1 | 6/2011 | Delecroix |
| 2013/0231024 A1 * | 9/2013 | Lecostaouec et al. ........ 442/211 |

OTHER PUBLICATIONS

UK Search report dated Sep. 24, 2010 in Application No. 1009785.5.
Restriction Requirement dated Jun. 6, 2013 in U.S. Appl. No. 12/774,119.

* cited by examiner

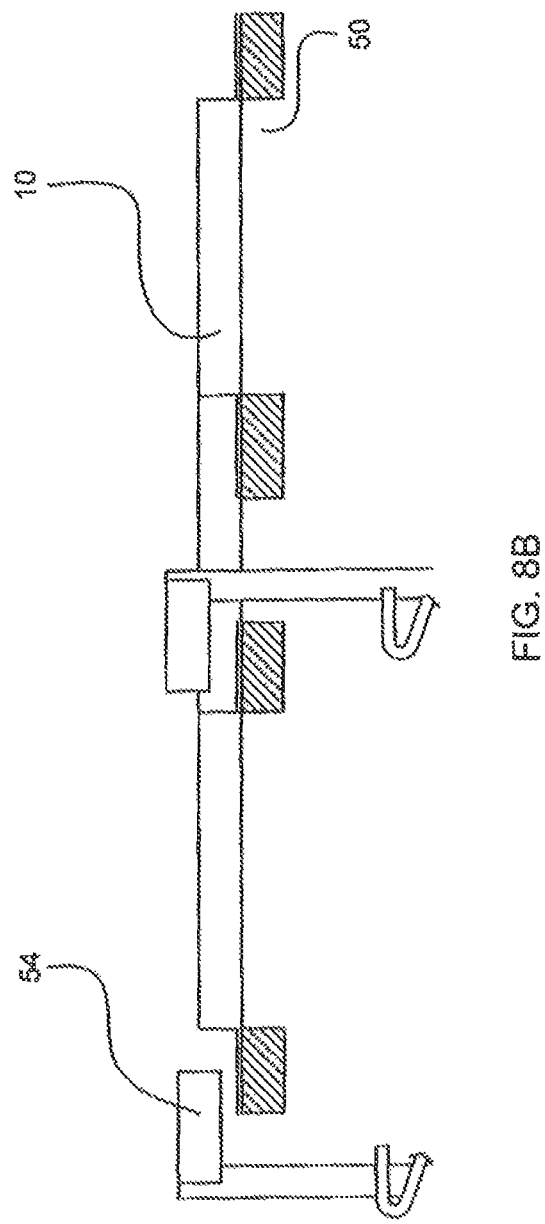

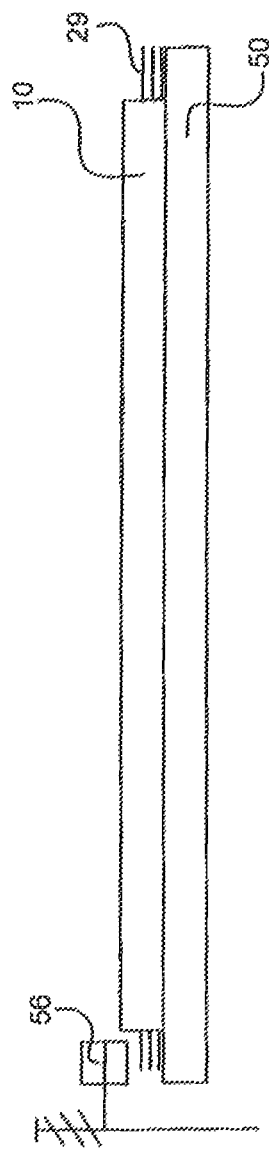

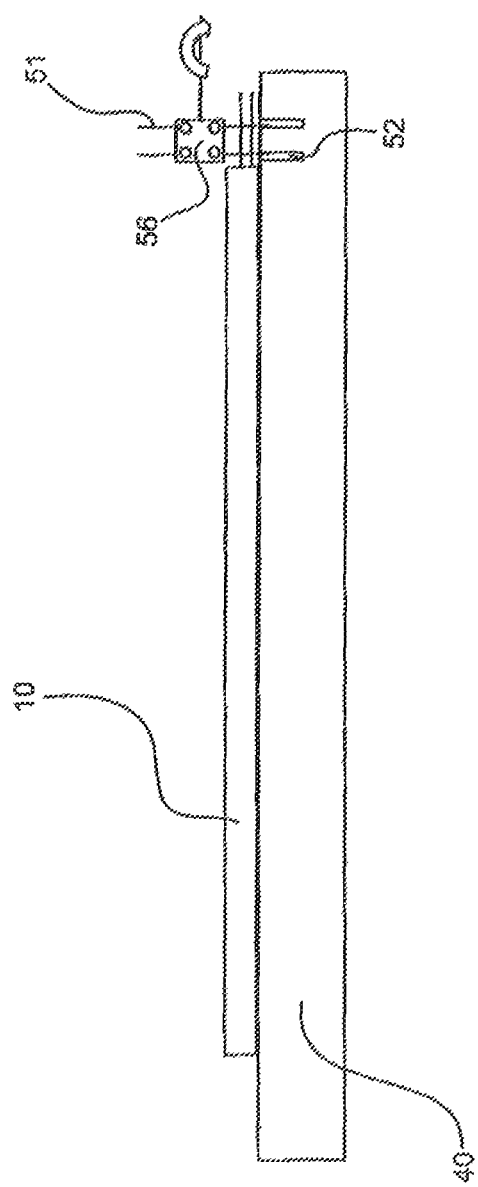

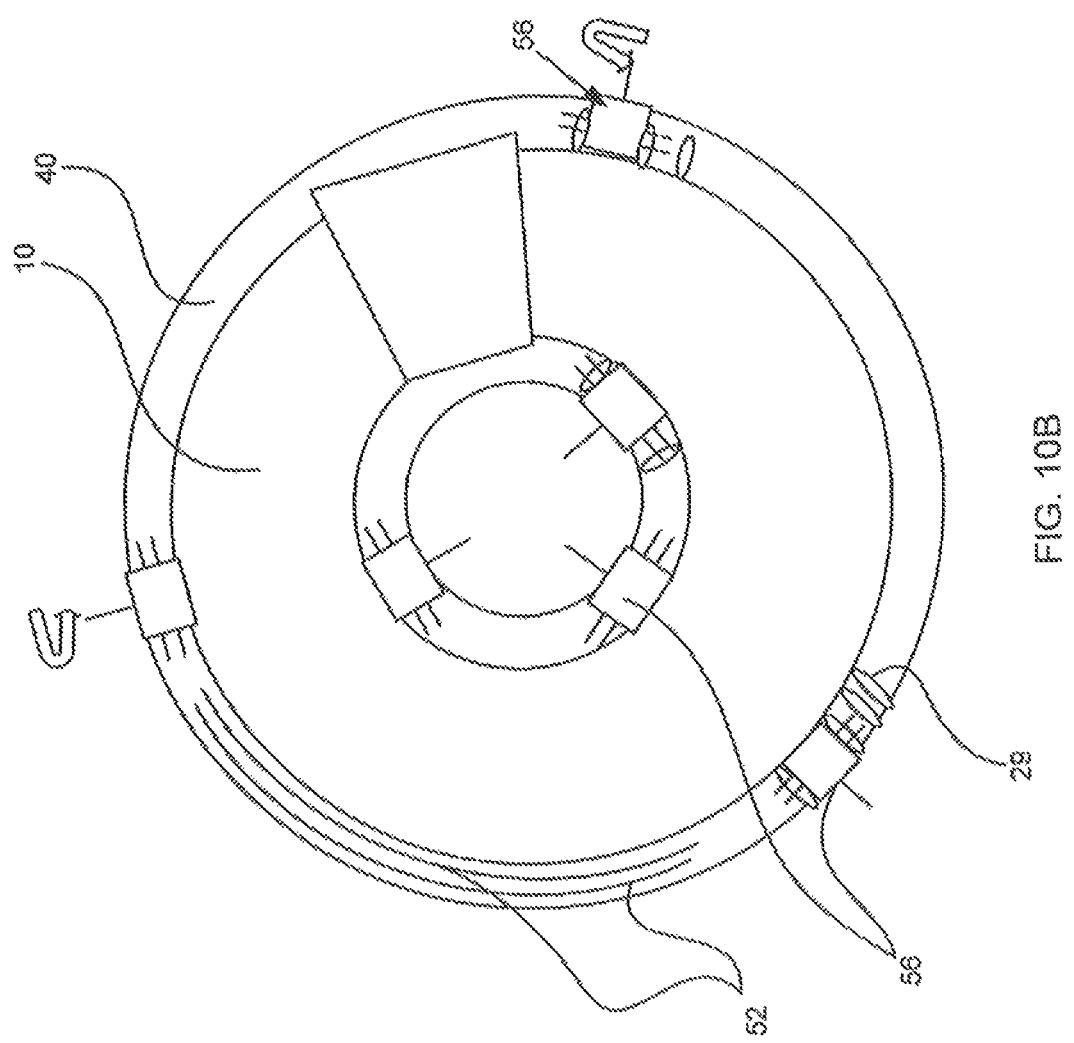

SYSTEM AND METHOD FOR TEXTILE POSITIONING

CROSS REFERENCE TO RELATED APPLICATION

This application is a divisional application of and claims priority to U.S. patent application Ser. No. 12/774,119, entitled "SYSTEM AND METHOD FOR TEXTILE POSITIONING," which was filed on May 5, 2010. The aforementioned application is hereby incorporated by reference herein in its entirety.

FIELD OF INVENTION

This invention generally relates to positioning and securing a textile, and more particularly, to systems and methods for positioning and securing a spiral textile on a rotational bed plate or entraining a textile on a stationary bed plate to needle the spiral textile into a circular preform.

BACKGROUND OF THE INVENTION

Carbon/carbon ("C/C") parts are employed in various industries. An exemplary use for C/C parts includes using them as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat and thus is able to dissipate heat away from the braking surfaces that is generated in response to braking. C/C material is also highly resistant to heat damage, and is thus capable of sustaining friction between brake surfaces during severe braking, without a significant reduction in the friction coefficient or mechanical failure.

C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. OPF fibers are layered in a selected orientation into a preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

A circular needle loom may be utilized to form a circular preform, for example, for use in creating carbon brake disks. Various textile technologies exist for fabricating a continuous carbon feed form for a circular needle loom, including yarn placement, stitch bonding, pre-needling, and loom weaving with conical take-up rolls. Narrow fabric needle looms may be utilized to produce a continuous spiral textile tape to be utilized in a circular needle loom to form a circular preform. These spiral textiles may contain warp fibers which lie along the length of the textile, and weft fibers which lie along the width of the textile.

Significantly, prior art looms and other apparatuses for manufacturing circular preforms suffer from inefficiencies in the manufacturing process. For example, a brush bed plate for a circular needle loom may be utilized to prepare a net shape brake preform. A rotary brush bed plate may be utilized to meet the transport and needling specifications of a thicker fibrous structure like a brake disk preform. However, maintenance and cleaning of the brush bed plate, and removal of the finished preform from the bed plate create extra steps in the needling process. These extra steps, among other reasons, substantially add to the time required to manufacture the preform, resulting in reduced efficiency, lower output and increased cost. Such brush bed plates are therefore generally not suitable for high production rates, and it is desirable to develop a system and method for increasing the efficiency of the manufacturing process to result in higher production rates and reduced costs Furthermore the brush bed plate does not always provide sufficient anchorage of the bottom layers, resulting in some cases of preform transport interruption during fabrication. The characteristics of the brush may change over time, thus resulting in higher maintenance and possibly in higher part to part characteristic variations than a smooth bed plate.

Additionally, existing systems and methods for manufacturing circular preforms may produce preforms that have undesirable properties. For example, a soft brush bed plate is compliant, and this compliancy may result in preforms with lower than desirable fiber volume. The lower than desirable fiber volume may result in a preform that is of lower quality.

Another reason for the deficiencies in the prior art with respect to quality of the preforms and the manufacturing efficiency is due to the complexities involved in working with a spiral textile. For example, the curvature of the spiral textile may require circuitous routes from a textile reel or feed system to the circular needle loom. Additionally, the texture and structure of the textile makes it difficult to deposit layers of the spiral textile on the circular needle loom. Furthermore, existing layering and needling processes make it difficult to remove the needled preform from the needle loom.

Significantly, prior art mechanisms and methods for transporting a spiral textile from a loom (where the textile is woven) to a circular needle loom require much more space in order to deliver the spiral textile in a complex path to the circular needle loom. This complex path is utilized in order to maintain the weave and overall shape of a spiral textile from the time it leaves the fabric needle loom to the time it is deposited in the circular needle loom. For example, the spiral textile may by layered horizontally on a spool as illustrated in FIG. 1, such that it is removed from the spool and oriented to be disposed horizontally on a circular needle loom. As can be appreciated, such a configuration requires that the textile tape change directions from the spool to the circular needle loom, resulting in a circuitous path from the spool to the loom.

It is thus desirable to develop a system and method for preparing net shape preforms from a continuous textile spiral feed that are not only suitable for high production rates with a high degree of repeatability, but that are also capable of producing preforms of a higher quality, for example, with a higher fiber volume. It is also desirable to develop systems and methods that utilize various mechanisms in conjunction with positional structure and/or to create positional structure of the spiral textile to facilitate layering and needling the spiral textile in an efficient manner to produce high quality needled preforms. Furthermore, it is desirable to create needled preforms in a manner that facilitates simplified removal of the preform from the needle loom. Moreover, it is desirable to develop a circular needle loom that reduces waste generated during the process of creating the brake disks.

Additionally, it is desirable to develop a mechanism for more conveniently transporting the spiral textile tape. It is further desirable to reduce the amount of space required to transport the spiral textile. Moreover, it is desirable to transport the spiral textile tape while reducing distortions in the weave of the spiral textile that are generated in existing spiral textile transport mechanisms

SUMMARY OF THE INVENTION

In order to address the deficiencies outlined above, various embodiments of a circular needle loom comprise a stationary bed plate for receiving a spiral textile. Engagement members may be disposed next to the stationary bed plate, such that they interface with a positional structure of the spiral textile that is used to rotate the spiral textile around the stationary bed plate. A conical roller deploys the spiral textile on the stationary bed plate. The circular needle loom may further comprise a needling zone to needle the spiral textile to create a needled preform. In accordance with an embodiment, the engagement members rotate the spiral textile around the stationary bed plate until a predetermined number of layers are deposited on the stationary bed plate. Utilizing a stationary bed plate facilitates creating a needled preform with a higher fiber volume than those preforms created by prior art systems and methods.

The positional structure, according to various embodiments, may include a sacrificial structure comprising one or both of a sacrificial edge and a fiber loop. Further, the engagement members of the loom comprise spikes that engage the positional structure and rotate the spiral textile on the stationary bed plate in a manner resulting in increased manufacturing efficiency of a needled preform.

In an embodiment, the circular needle loom further comprises an inside support disposed about an inside portion of the stationary bed plate, and/or an outside support disposed about an outside portion of the stationary bed plate. The engagement members are positioned next to at least one of the inside support and the outside support. The engagement members may further comprise clamps to secure the spiral textile to at least one of the inside support and the outside support, and at least one of the inside support and the outside support rotate with respect to the stationary bed plate to facilitate rotating the spiral textile around the stationary bed plate. In an embodiment, the circular needle loom further comprises spikes located by at least one of the inside support and the outside support, and the spikes penetrate the positional structure to secure the spiral textile with the clamps to facilitate rotating the spiral textile around the stationary bed plate.

According to various embodiments, the engagement members comprise wheels with spikes that engage the positional structure to rotate the spiral textile around the stationary bed plate. The stationary bed plate comprises circumferential spike grooves into which the spikes on the wheels pass as the wheels rotate.

A method for needling a spiral textile to create a needled preform with a higher quality and in a more efficient manner comprises receiving the spiral textile on a bed plate of a circular needle loom and engaging a positional structure of the spiral textile. The spiral textile is then rotated around the circular needle loom until a predetermined number of layers of the spiral textile have been deposited on the bed plate. The spiral textile is then needled by the needle loom to create the needled preform.

In accordance with various embodiments, a spiral textile comprises an inside diameter and an outside diameter. A weft tow extends from the inside diameter to the outside diameter, and a positional structure is located next to and/or is attached to the weft tow. The positional structure may also be proximate to the inside diameter and/or the outside diameter of the textile. Further, the positional structure facilitates positioning the spiral textile in a desired manner with respect to a circular needle loom in order to create a needled preform. Such positional structure overcomes deficiencies with prior art spiral textiles, for example, because the positional structure enables production of needled preforms with higher fiber volume.

In various embodiments, the positional structure is a sacrificial structure comprising loops, ridges and/or sacrificial edges. The positional structure may be formed from synthetic, natural, carbon and/or other materials. In an embodiment, the sacrificial structure extends from about 0.15 inches to about 1.0 inch from the inside diameter and/or the outside diameter, and the sacrificial structure may be burned off and/or otherwise removed from the spiral textile and/or the needled preform. Further, in an embodiment, the sacrificial structure may extend about 3/16 of an inch from the inside diameter and/or outside diameter.

According to an embodiment, the positional structure is a fiber loop. A loop weft tow in the spiral textile extends from the outside diameter to the inside diameter of the textile, and the fiber loop is connected to the loop weft tow. The fiber loop and the loop weft tow may comprise carbon fibers, natural fibers, and/or synthetic fibers. In various embodiments, the fiber loop is created during weaving of the spiral textile in a narrow fabric needle loom. However, in an embodiment, the fiber loop is attached to the loop weft tow by stitching and/or thermal bonding after weaving the spiral textile in the narrow fabric needle loom.

The positional structure, according to various embodiments, interfaces with an engagement mechanism on the circular needle loom. The engagement mechanism may include a wheel, a clamp, a spike and/or other engagement mechanism. The positional structure in conjunction with the engagement mechanism facilitates layering and needling the spiral textile in an efficient manner to produce high quality needled preforms. Furthermore, the positional structure facilitates simplified removal of the preform from the needle loom.

In accordance with an embodiment, a circular needled preform comprises a plurality of layers of a spiral textile needled together by a circular needle loom. A weft tow with a first end and a second end is located in the spiral textile. A positional structure interfaces with the first end of the weft tow and/or the second end of the weft tow. The positional structure also interfaces with an engagement mechanism of the circular needle loom in order to deposit the plurality of layers of the textile and facilitate needling the textile to create the needled preform. During and/or after the needling process, the positional structure may be removed from the spiral textile.

In various embodiments, methods for creating a circular needled preform from a spiral textile comprise weaving a weft tow from an inside diameter to an outside diameter of the spiral textile into a plurality of warp tows, with the plurality of warp tows being spaced between the inside diameter and the outside diameter. Sacrificial fibers are attached to the weft tow and/or the plurality of warp tows, with the sacrificial fibers being located next to the inside diameter and/or the outside diameter of the textile. An engagement mechanism on a circular needle loom engages the sacrificial fibers to facilitate moving the spiral textile on the circular needle loom. The spiral textile is moved on the circular needle loom until a predetermined number of layers of the spiral textile are deployed on the loom. In an embodiment, the sacrificial fibers are removed from the spiral textile to create the circular needled preform.

In various embodiments, the present disclosure relates generally to a method for needling a spiral textile to create a needled preform, the method comprising receiving the spiral textile on a bed plate of a circular needle loom, engaging a positional structure of the spiral textile, rotating the spiral textile around the circular needle loom, depositing a predetermined number of layers of the spiral textile on the bed plate, and needling the spiral textile to create the needled preform. Moreover, the present disclosure also provides, in various embodiments, a method for creating a circular needled preform from a spiral textile, comprising weaving a weft tow from an inside diameter to an outside diameter of the spiral textile into a plurality of warp tows spaced between the inside diameter and the outside diameter, attaching sacrificial fibers to at least one of the weft tow and the plurality of warp tows proximate at least one of the inside diameter and the outside diameter, engaging the sacrificial fibers with an engagement mechanism on a circular needle loom, moving the spiral textile on the circular needle loom to deploy a predetermined number of layers of the spiral textile on the circular needle loom, and removing at least a portion of the sacrificial fibers after needling the spiral textile.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, tows and yarns (and their orientations) in practice are very small and closely packed, the figures herein may show exaggerated fiber width and spacing in order to more clearly illustrate the fiber orientations.

FIG. 8B illustrates a sectional side view of a needle loom with a rotational bed plate according to an embodiment;

FIG. 9C illustrates a sectional side view of a needle loom with a rotational bed plate according to an embodiment;

FIG. 10A illustrates a sectional side view of a needle loom with a stationary bed plate according to an embodiment;

FIG. 10B illustrates a top view of a needle loom with a stationary bed plate according to an embodiment;

DETAILED DESCRIPTION

Figure 1:
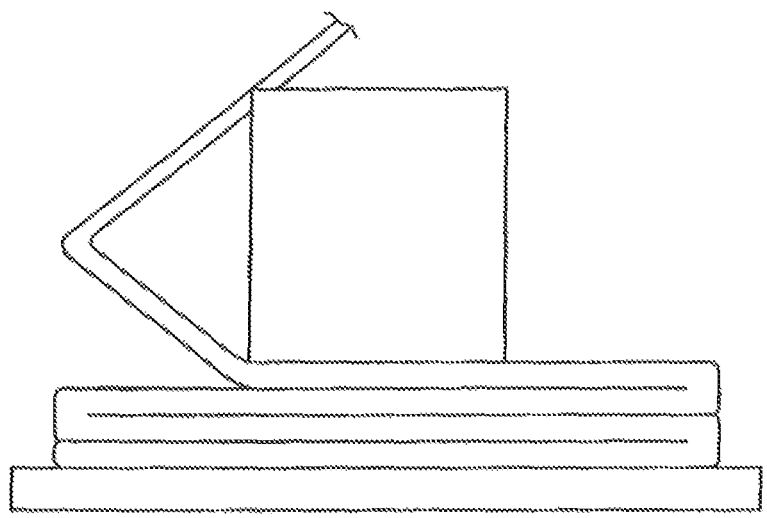
FIG. 1 illustrates a prior art textile spool.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical, electrical, and mechanical changes may be made without departing from the spirit and scope of the invention. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

As noted above, existing methods and systems for manufacturing circular preforms suffer from inefficiencies in the manufacturing process and reduced quality in the finished preforms. According to various embodiments, stationary and/or movable bed plates in a circular needle-punching loom (referred to herein as a "circular needle loom") may be utilized to produce net shape preforms, such as net shape carbon preforms for brakes. Such circular needle looms may be advantageously utilized to form a near net shape needle preform with minimum waste. Stationary bed plates may be smooth bed plates, such that the spiral textile rotates over, and with respect to, the stationary bed plate to facilitate layering and/or needling the textile. Movable bed plates may be rotatable bed plates that comprise a surface which generates friction between the bed plate and the spiral textile such that the bed plates move and/or entrain the spiral textile to facilitate layering and/or needling the textile. The circular needle loom comprises a needling zone, and the spiral textile is entrained through the needling zone to facilitate creating the preform.

Further, in order to address difficulties that existing systems have in working with spiral textiles, and in accordance with various embodiments, mechanisms may be utilized to secure the spiral textile on a movable bed plate and/or to cause the spiral textile to move over, about, across and/or around a stationary bed plate to facilitate needling the textile. For example, in an embodiment, an engagement mechanism may interface with structure at the outside diameter ("OD") and/or inside diameter ("ID") of the textile tape to cause the spiral textile to move with the movable bed plate. Further, in an embodiment, an engagement mechanism may interface with structure at the OD and/or ID of the textile tape to cause the spiral textile to move over, about, across and/or around a stationary bed plate. Structures for securing and/or moving the textile may be referred to collectively herein as positional structures and/or textile positional structures.

Figure 2:
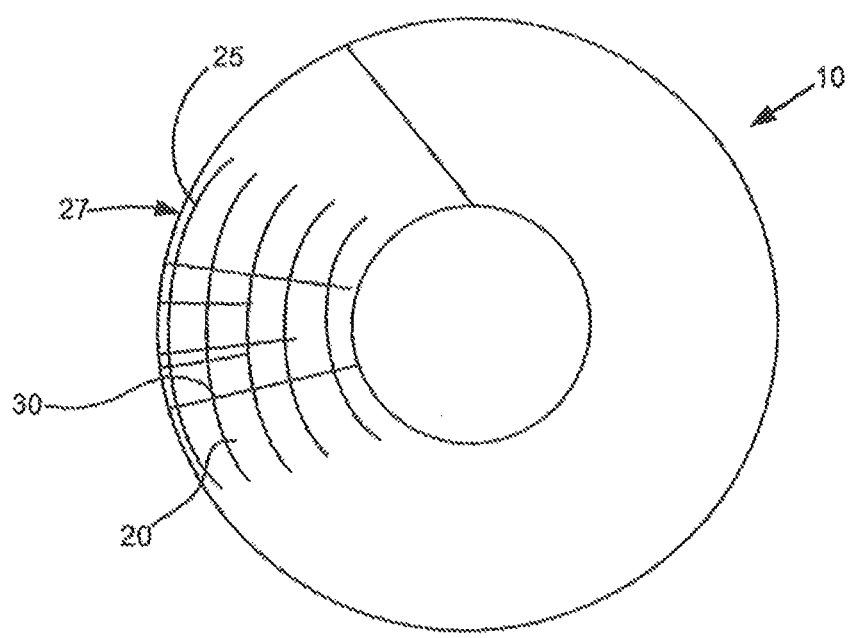
FIG. 2 illustrates a spiral textile with a sacrificial edge according to an embodiment.

In accordance with various embodiments, and with reference to FIG. 2, positional structure 27 at the outside and/or inside diameters of textile tape 10 may be included during and/or after weaving of the spiral textile, for example, by a narrow fabric needle loom. The spiral textile includes warp 20 and weft 30 fibers. As used herein, the terms "tow" and "cable" include a strand of substantially continuous filaments. As used herein, the term "yarn" includes a strand of substantially continuous fibers or staple fibers or blends of these; thus the term "yarn" encompasses tow and cable. "Warp" fibers include fibers that lie in the "warp" direction in the textile—i.e., along the length of the textile. "Weft" fibers include fibers that lie in the "weft" direction in the textile—i.e., across the width of the textile. Warp fibers 20 may be described as being spaced apart with respect to the weft direction (i.e., spaced apart between the OD and ID of the textile). Similarly, the weft fibers 30 may be described as being spaced apart with respect to the warp direction.

The spiral textile tape 10 may include weft fibers 30 of varying lengths to facilitate obtaining a substantially homogeneous fiber volume and/or density, and/or to generate a tailorable fiber density that increases towards the OD of the textile. Positional structure 27 at the OD and ID of the spiral textile may include loops, ridges, sacrificial edges, and the like, as discussed further below. Where positional structures 27 (such as loops, ridges, edges, and the like) are removed after completion of the preform, they may be referred to as sacrificial structures and/or edges. Any structure that may facilitate moving and/or securing the textile is contemplated within the scope of the present disclosure. It should be understood that in various embodiments, the positional structure may only be located at the ID or OD of the textile, or at both the ID and the OD. Such positional structure, as discussed further below, facilitates moving and positioning spiral textile 10 in an efficient manner in order to overcome certain deficiencies in the prior art.

In an embodiment, and with continued reference to FIG. 2, a spiral textile tape 10 includes warp fibers 20 running in the direction of textile tape 10, and weft fibers 30 across the width of textile tape 10. Some weft fibers 30 may extend substantially across the width of textile tape 10, and some weft fibers 30 may extend from the OD to a point between the OD and the ID of textile tape 10.

Figure 3:
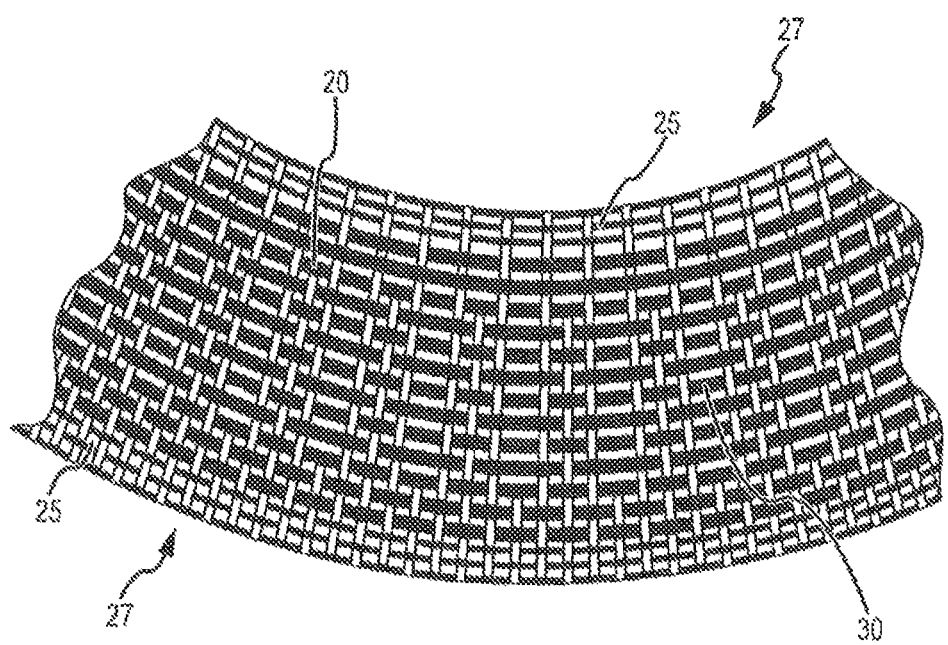
FIG. 3 illustrates a portion of a spiral textile with sacrificial fibers according to an embodiment.

In various embodiments, with reference to FIGS. 2 and 3, textile tape 10 further includes sacrificial fibers 25 co-woven with warp fibers 20 near the OD and ID of textile tape 10. For example, in a carbon textile, warp fibers 20 may comprise carbon fibers, and sacrificial fibers 25 may comprise synthetic fibers. Sacrificial fibers 25 may be utilized to form a sacrificial edge 27 that is utilized to secure and/or rotate textile tape 10 with respect to the circular loom bed plate, as discussed further below. Synthetic sacrificial fibers 25, according to various embodiments, may burn off during heating of the carbon preform, thereby reducing the cost of the carbon preform with respect to utilizing carbon fibers as the sacrificial fibers. In an embodiment, the excess material used for transporting the fabric and the preform may be cut following completion of the preform, as discussed below. It should be understood that carbon, polymers or any other suitable material may be utilized as sacrificial fibers 25 without departing from the scope of the present disclosure. In various embodiments, sacrificial edge 27 extends from about 0.15 inches to about 1.0 inch from the OD and/or ID of textile tape 10. Further, in an embodiment, the sacrificial edge 27 may extend about 3/16 of an inch from the OD and/or ID of textile tape 10.

In accordance with various embodiments, a narrow fabric needle loom may be utilized to weave the sacrificial fibers in the spiral textile in order to address certain deficiencies with the prior art. During the loom set up, sacrificial fibers 25 are added in the warp direction along both sides of the carbon warp fibers 20. During weaving, the carbon weft fibers 30 are interlaced with the synthetic warp fibers 25 to provide strong sacrificial edges 27 to the carbon textile 10.

Figure 4:
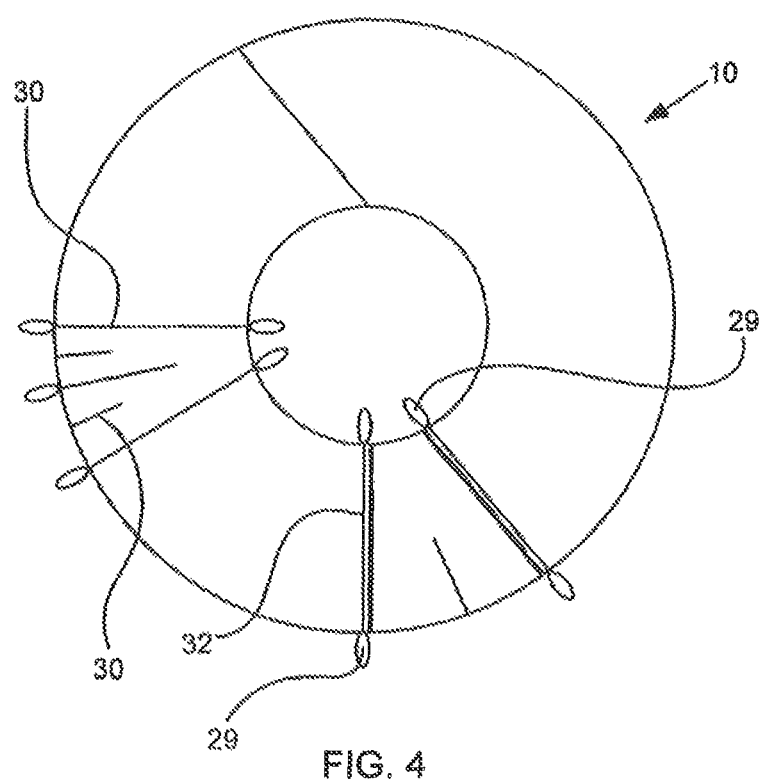
FIG. 4 illustrates a spiral textile with fiber loops according to an embodiment.

With reference to FIG. 4, an embodiment of spiral textile tape 10 comprises fiber loops 29 proximate the OD and/or ID of spiral textile tape 10. Fiber loops 29 may be an extension of weft fibers 30 and may comprise the same or different material as weft fibers 30. For example, where weft fibers 30 comprise carbon weft fibers, fiber loops 29 may comprise an extension of the carbon weft fibers. Where fiber loops 29 comprise polymeric fiber loops 29, the polymeric fiber loops may not be part of the finished preform. For example, polymeric and/or synthetic fiber loops may be burned off or otherwise removed during heating of the carbon preform. In various embodiments, fiber loops 29 protrude from about 0.15 inches to about 1.0 inches from the OD and ID of textile tape 10. Fiber loops 29 may be utilized to secure and/or move textile 10 with respect to the circular needle loom bed plate to overcome deficiencies in the prior art, as discussed further below.

In various embodiments, fiber loops 29 may be created during and/or after the manufacturing of textile tape 10 on a narrow fabric needle loom. For example, a weft insertion needle in the needle loom may produce carbon fiber loops 29 at either end of a carbon weft fiber 30 insertion. In an embodiment, a loop weft tow such as polymeric weft tow 32 may be inserted with the weft insertion needle, and the needle loom may create loops 29 at either end of polymeric weft tow 32. According to an embodiment, fiber loops 29 may be formed through a separate process than during the weaving process. After the weaving process, fiber loops 29 may be attached to the spiral tape 10 through, for example, stitching and/or thermal bonding. It should be understood that any mechanism for creating fiber loops 29 out of any material are contemplated within the scope of the present disclosure.

Figure 5A:
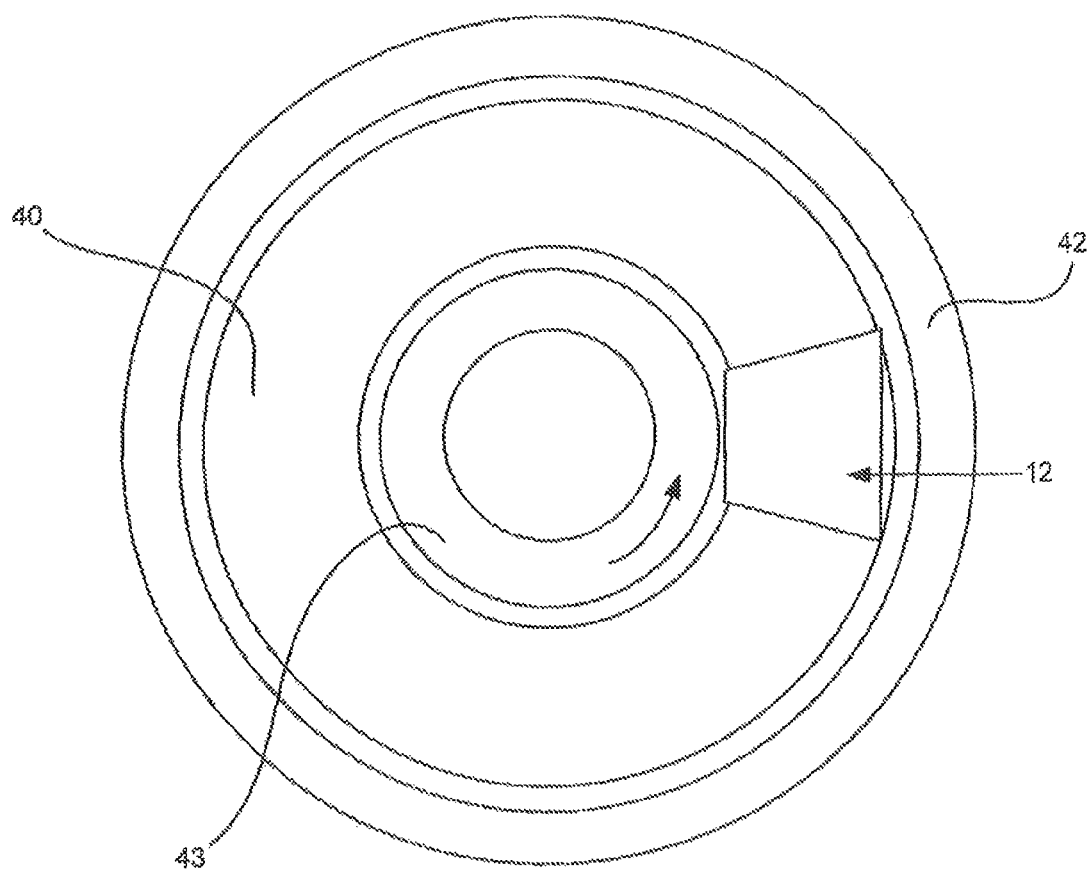
FIG. 5A illustrates a top view of a needle loom according to an embodiment.
Figure 5B:
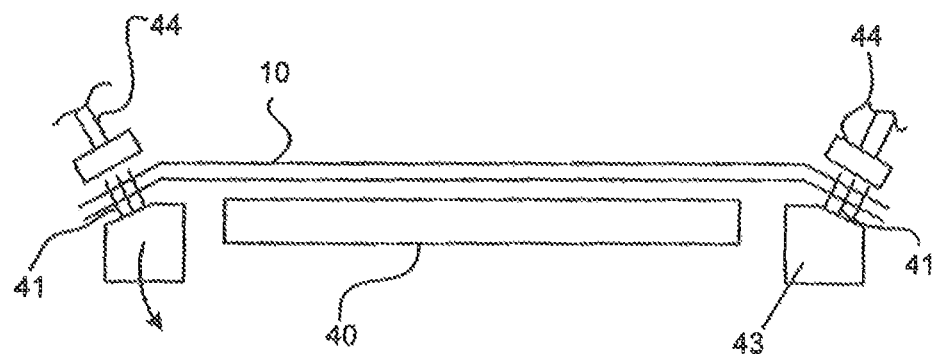
FIG. 5B illustrates a sectional side view of a needle loom outer rotating ring with pins and clamps according to an embodiment.

Various embodiments include mechanisms and/or apparatuses that utilize positional structure such as sacrificial edge 27 and/or fiber loops 29 to secure and/or move textile 10 with respect to a bed plate of a circular needle loom, in order to increase the efficiency of manufacturing a needled preform. For example, with reference to FIGS. 5A-5B, a stationary bed plate such as smooth circular bed plate 40 is disposed between rotational outside support element 42 and rotational inside support element 43. Textile 10 is disposed on stationary bed plate 40, and sacrificial edges 27 are proximate support elements 42, 43. Support elements 42, 43 may include pins and/or spikes 41 that protrude through sacrificial edge 27, and/or may include retractable clamps 44 to facilitate rotating textile 10 with rotating support elements 42, 43. Such a configuration facilitates rotating textile tape 10 around stationary bed plate 40 with rotating support elements 42, 43. In an embodiment, support elements 42, 43 may comprise a plurality of individual support elements disposed around the OD and ID circumferences of textile tape 10. Rails, chains, belts and other transport/entrainment mechanisms may be utilized to rotate support elements 42, 43 and/or other types of engagement members disclosed herein.

Rotating support elements 42, 43 continue to rotate with respect to stationary bed plate 40 until a desired number of layers of textile 10 are needled with needling boards 12. To accommodate increased thickness of textile 10 as the number of layers increases, the top surface of supports 42, 43 may be recessed. Further, top and/or oblique surfaces of supports 42, 43 may be tapered to exert lateral tension on textile 10 to facilitate making the tape flat under the circumnferential forces applied to textile 10 during transport under needle boards 12.

In various embodiments, retractable clamps 44 have two degrees of movement: a vertical motion to pinch and release textile 10, and a rotational motion to clear the path for removal of the preform following completion of the needling operation with the desired number of textile layers. In various embodiments, retractable clamps 44 may be activated using pneumatic, hydraulic or electrical systems. Further, in an embodiment, retractable clamps 44 may utilize a swivel motion to retract, such that retractable clamps 44 may have a c-shaped geometry and may be articulated around a horizontal axis. The c-shaped clamps 44 swivel toward and away from the textile around that axis to facilitate clamping and releasing the textile.

In an embodiment, clamps 44 and/or spikes 41 are utilized to secure the first few bottom layers of the preform. Further, clamps 44 and/or spikes 41 may be utilized to secure one or more layers, wherein the number of layers is determined to facilitate stability of the preform being built, for example, by facilitating moving the preform around the bed plate. Two or more sets of clamps may be controlled in pairs (e.g., one pair constitutes one inner and one outer clamp) and/or at different times to provide clamping along the edges of textile 10. For example, a first pair of clamps may be utilized to secure the first layer of textile 10 to supports 42, 43 as the first layer is disposed on the bed plate. Other sets are subsequently activated as the tape moves over the bed plate. For example, certain clamps 44 may be utilized to secure other areas of the first layer, and certain clamps 44 may be utilized to secure the second, third, etc. layers.

In various embodiments, it may not be necessary to clamp and/or pin higher numbers of layers. For example, where the first, second, and third layers are clamped, it may not be necessary to clamp additional layers, because clamping the first three layers may be sufficient to facilitate moving textile 10 with respect to bed plate 40. However, it should be understood that any number of layers may be clamped and/or pinned, such that the number is sufficient to facilitate moving textile 10 with respect to bed plate 40.

Figure 6A:
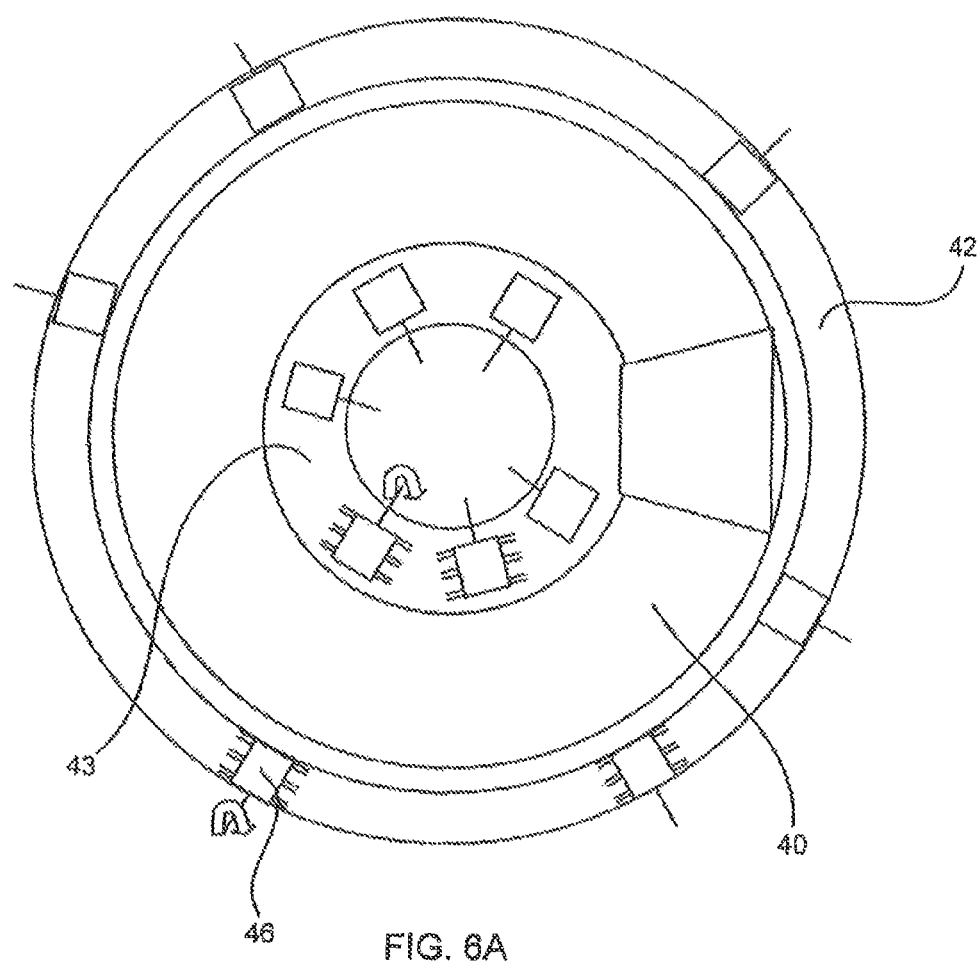
FIG. 6A illustrates a top view of a needle loom with a stationary bed plate according to an embodiment.
Figure 6B:
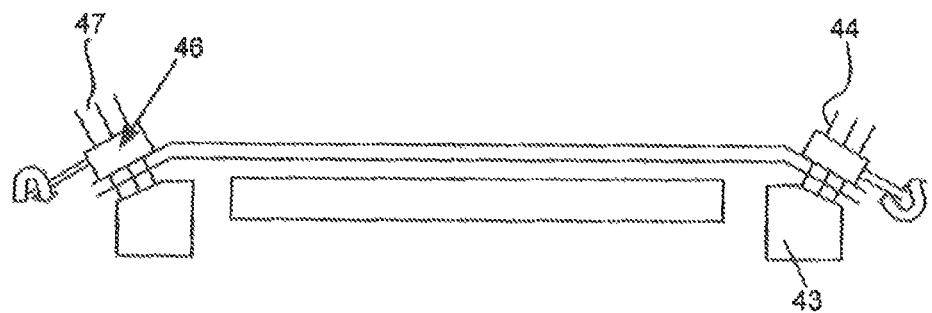
FIG. 6B illustrates a sectional side view of a needle loom with a stationary bed plate and with wheels according to an embodiment.
Figure 7A:
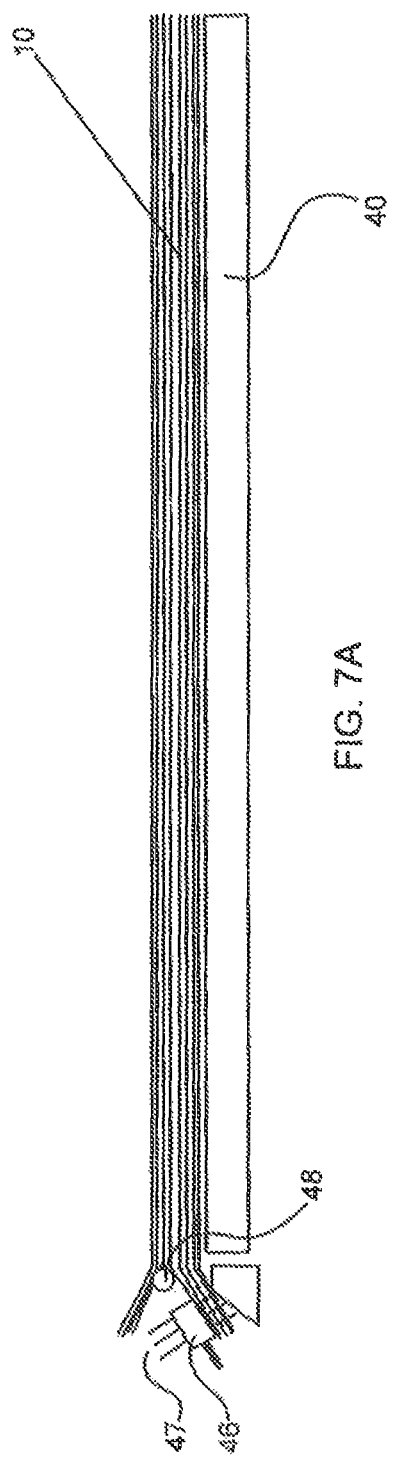
FIG. 7A illustrates a partial side sectional view of a needle loom with layers of a textile according to an embodiment.
Figure 7B:
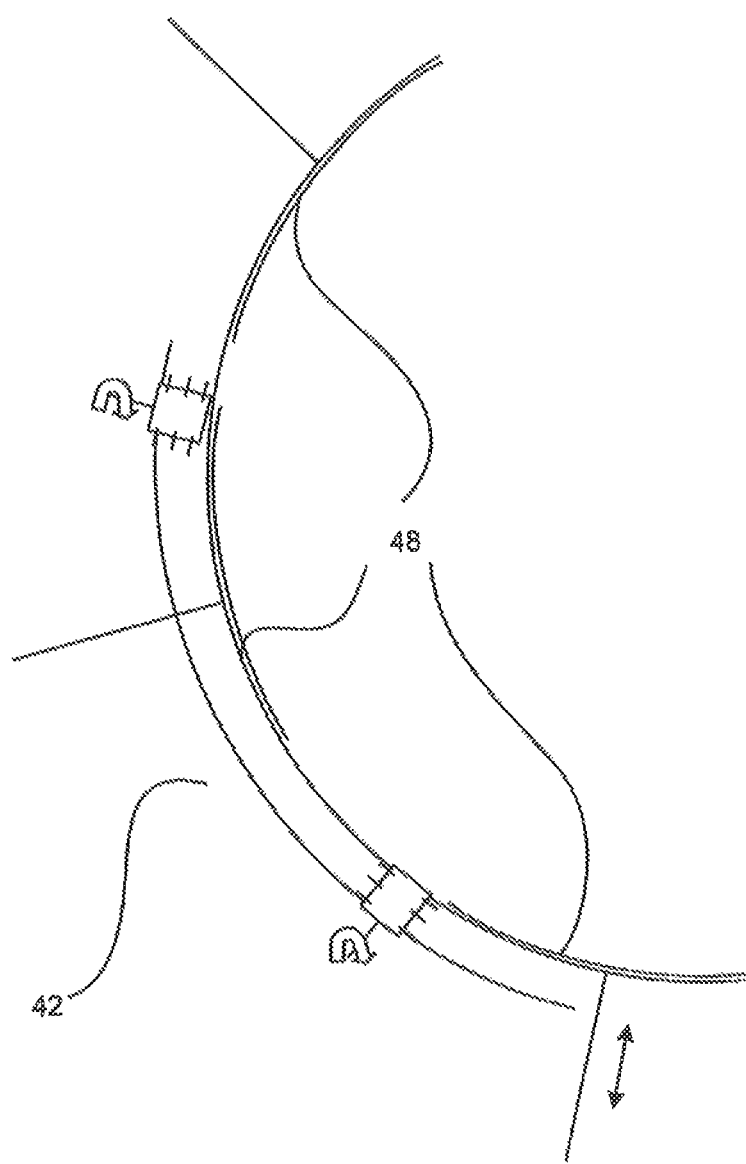
FIG. 7B illustrates a partial top view of a needle loom with a support guide according to an embodiment.
Figure 8A:
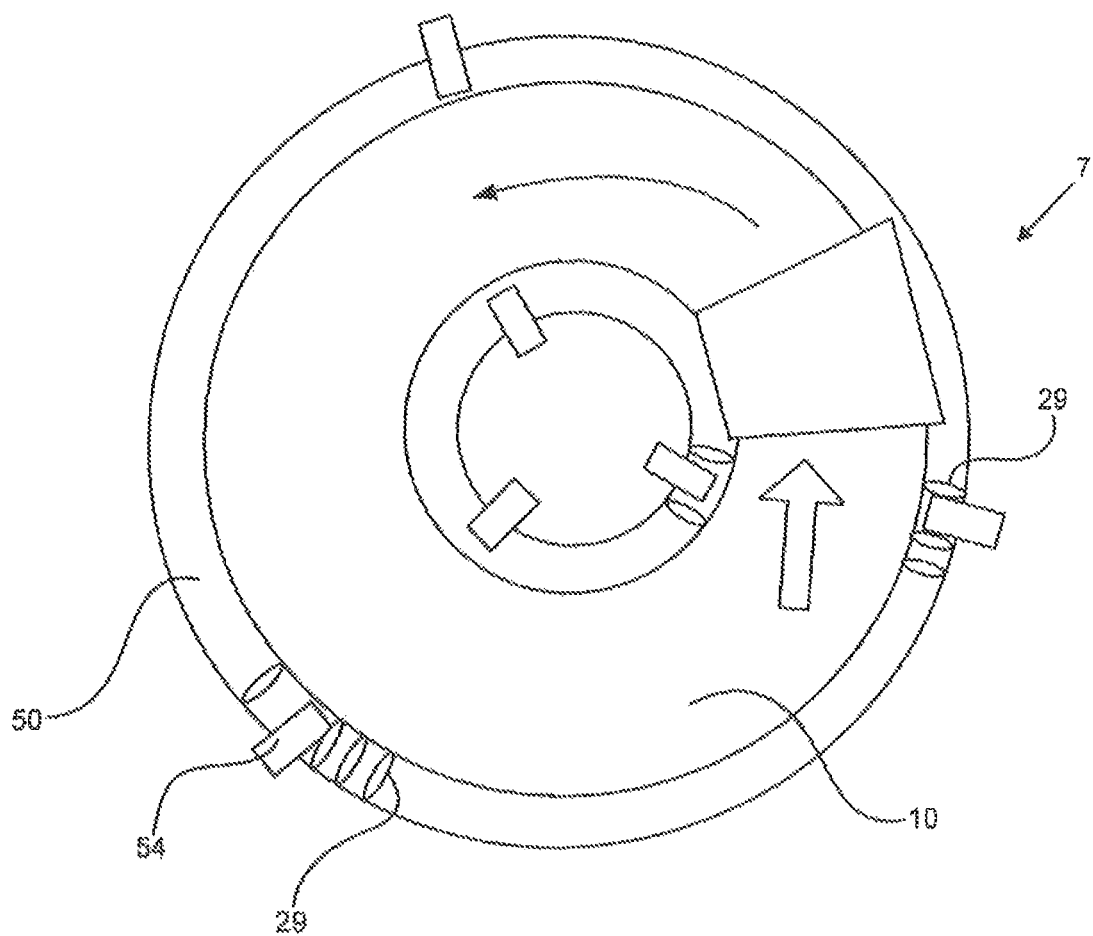
FIG. 8A illustrates a top view of a needle loom with a rotational bed plate according to an embodiment.

According to an embodiment, and with reference to FIGS. 6A-6B, elements 42, 43 may be stationary, and motorized wheels 46 with spikes 47 may rotate textile 10 with respect to stationary bed plate 40 and stationary support elements 42, 43. Spikes 47 may penetrate positional structure 27 to facilitate moving textile 10, and spikes 47 may be dimensioned to penetrate a desired number of layers of textile 10. Wheels 46 may be spring-loaded and/or adjustable to allow the wheels to move upward as additional layers of textile 10 are deposited on bed plate 40. According to various embodiments, and with reference to FIGS. 7A-7B, wheels 46 and spikes 47 may penetrate the first one through four layers of textile 10. In embodiment, spikes 47 penetrate a sufficient number of layers to provide stability to the preform and/or to facilitate rotating textile 10 about stationary bed plate 40. Retractable support guides 48 may be utilized to prevent subsequent layers from being penetrated by spikes 47, because the subsequent layers rest on support guides 48. For example, support guides 48 may be inserted after a predetermined number of layers of spiral textile 10 have been needled. In an embodiment, support guides 48 are inserted starting with the support guide upstream of the first pair of wheels 46 where the spiral tape enters the needle loom.

Figure 9A:
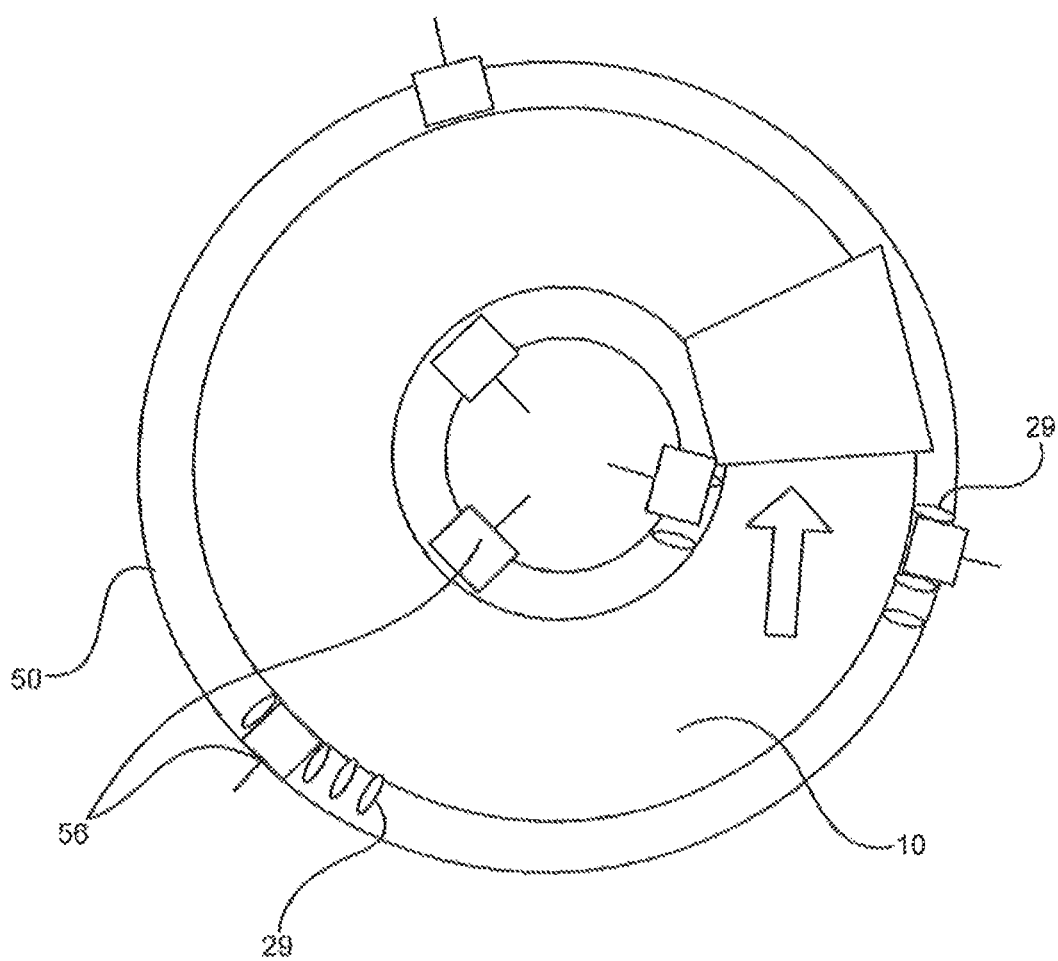
FIG. 9A illustrates a top view of a needle loom with a rotational bed plate and with wheels according to an embodiment.
Figure 9B:
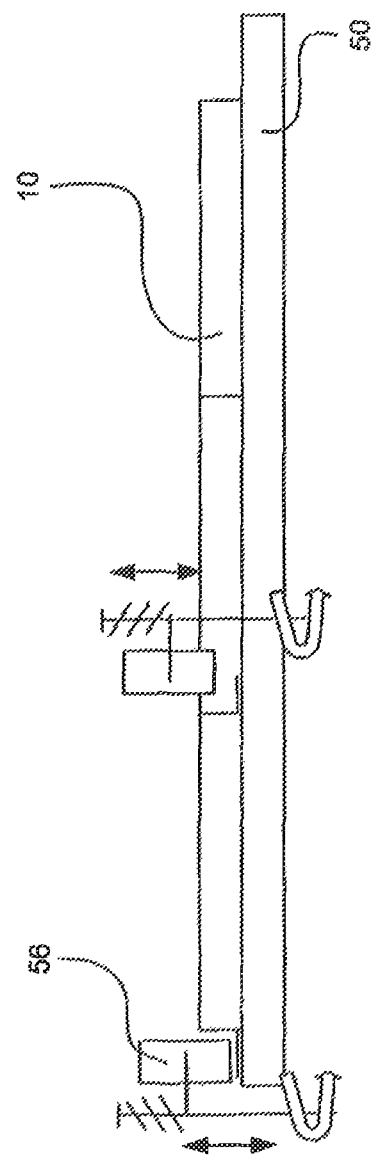
FIG. 9B illustrates a sectional side view of a needle loom with a rotational bed plate and with wheels according to an embodiment.

In order to overcome certain inefficiencies in the prior art discussed above, and in accordance with various embodiments, positional structure such as sacrificial edge 27 and/or fiber loops 29 may be utilized to secure textile 10 to a rotational bed plate or to rotate textile 10 over a stationary bed plate. For example, with reference to FIGS. 9A-9B, rotational bed plate 50 may be utilized to create layers of textile 10 to facilitate needling textile 10 into a circular preform. Rotational bed plate 50 may comprise a honeycomb or circumferential groove structure to facilitate rotating textile 10 with bed plate 50. Such bed plates may not exhibit the same compliancy as brush bed plates of the prior art, and therefore facilitate manufacturing preforms with higher fiber volume.

In various embodiments, circular needle loom 7 includes rotatable clamps 54 that are movable with rotational bed plate 50, and that further facilitate rotating textile 10 with bed plate 50. For example, clamps 54 may clamp a sacrificial edge and/or fiber loops 29 to secure textile 10 to bed plate 50. Clamps 54 may be located at the OD and ID of textile 10 and/or bed plate 50.

Clamps 54 may be movable in a rotational direction and in a vertical direction. For example, clamps 54 may rotate into place when fiber loops 29 are in the proper location, and the clamps may then move vertically towards bed plate 50 to contact fiber loops 29 and secure textile 10 to bed plate 50. Then, when sufficient layers have been deposited, clamps 54 may move vertically away from bed plate 50 and then rotate away from fiber loops 29 to facilitate removal of the preform. In an embodiment, after rotating away from fiber loops 26, clamps 54 may move vertically downward so as to be below the surface of bed plate 50. In this position, the preform created by layers of textile 10 may be automatically pushed away from bed plate 50, for example, with the use of a dedicated arm or other mechanism to remove the preform. Such removal, for example, increases the efficiency in the manufacturing process of the preform and thereby reduces costs associated with existing systems.

In various embodiments, different sets of clamps 54 may be utilized to secure textile 10 to bed plate 50. For example, as the first layer of textile 10 is deposited, a first set of clamps 54 near a feeding zone 53 for textile 10 (i.e., where textile 10 is fed onto bed plate 50), may be engaged with fiber loops 29. Further sets of clamps 54 may be activated as additional layers of textile 10 are deposited.

According to various embodiments, mechanisms may be utilized to secure a spiral textile to a rotational bed plate to facilitate needling layers of the textile into a preform. For example, with reference to FIGS. 9A-9C, wheels 56 may be utilized to secure textile 10 to rotational bed plate 50. Wheels 56 may be spring loaded and biased towards bed plate 50. As bed plate 50 rotates, wheels 56 roll over fiber loops 29, thereby securing textile 10 to rotational bed plate 50. As additional layers of textile 10 are deposited, wheels 56 move vertically to accommodate the additional layers of fiber loops 29, but still maintain pressure on fiber loops 29 due to the spring biasing the wheels towards bed plate 50. When a desired number of layers of textile 10 have been deposited, wheels 56 may be rotated away from fiber loops 29 to facilitate removing the preform from bed plate 50.

In various embodiments where textile 10 may be moved across a stationary bed plate 40, for example, with reference to FIGS. 10A-10B, clamps and/or motorized wheels 56 with spikes 51 may drive textile 10 around stationary bed plate 40. Wheels 56 may be located at the OD and/or ID of textile 10. The axis of rotation of wheels 56 is parallel to stationary bed plate 40, such that wheels 56 roll across the surface of bed plate 40. Bed plate 40 includes circumferential spike grooves 52 that are dimensioned to allow spikes 51 to pass below the surface of bed plate 40 when wheels 56 rotate. Such a configuration allows spikes 51 to pass through fiber loops 29 of textile 10 and thereby drive textile 10 around bed plate 40 with the rotation of wheels 56. Wheels 56 may be biased with a spring towards bed plate 40, such that wheels 56 move vertically to accommodate a desired number of layers of textile 10 as the preform is created. In an embodiment, a support guide similar to support guide 48 (see FIGS. 7A-7B) may be utilized to limit the engagement of wheels 56 and spikes 51 to the first few layers of the spiral textile.

In an embodiment, clamps are used in connection with rotational support elements at the OD and/or ID of the stationary bed plate to create a needled preform. For example, where a spiral textile comprises loops for a positional structure, clamps may be utilized to clamp the loops to the rotational support elements to facilitate rotating the spiral textile around the stationary bed plate. In an embodiment, spikes may or may not be used in connection with the loops, clamps and/or rotational support elements. For example, spikes may be advantageously used to position the initial spiral textile layers.

Figure 11:
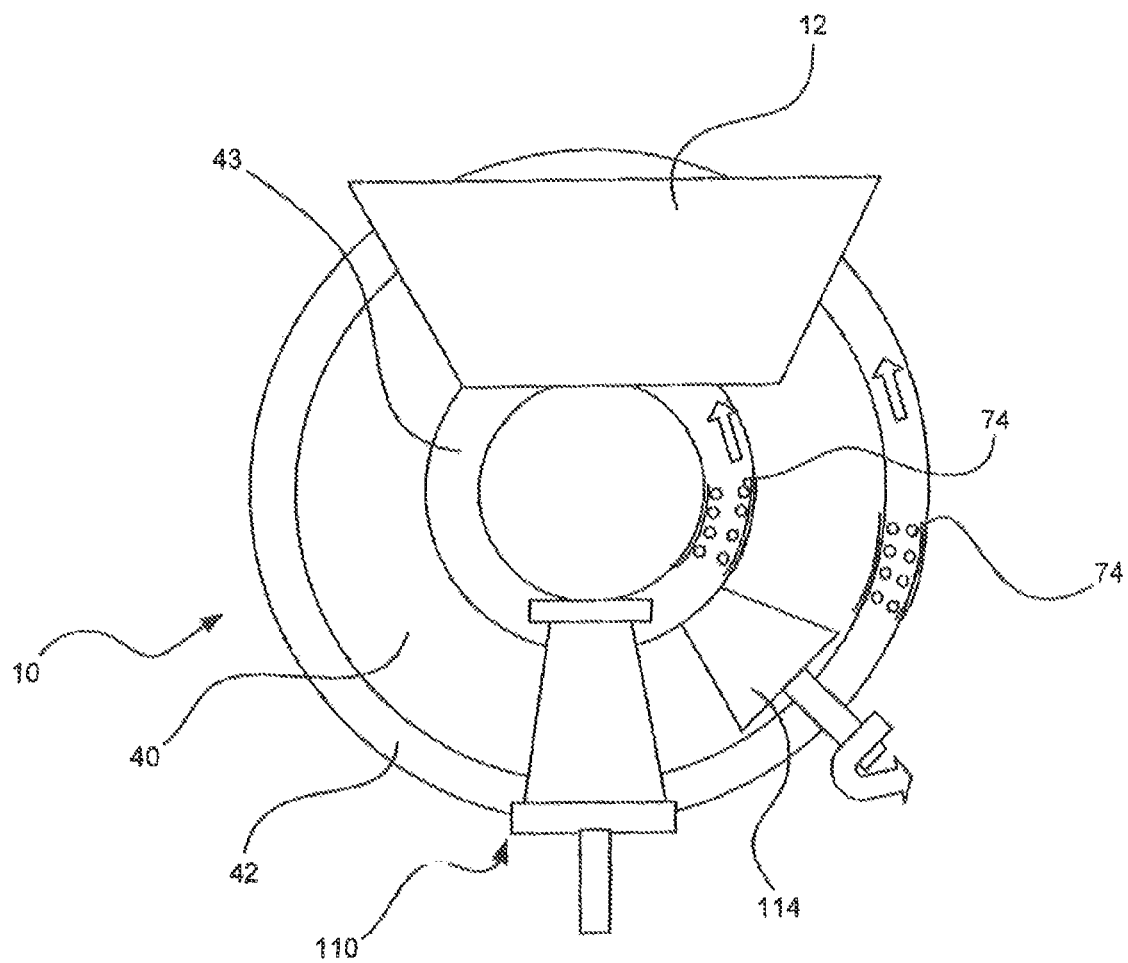
FIG. 11 illustrates a top view of a circular needle loom with spikes on rotational support elements according to an embodiment.
Figure 12:
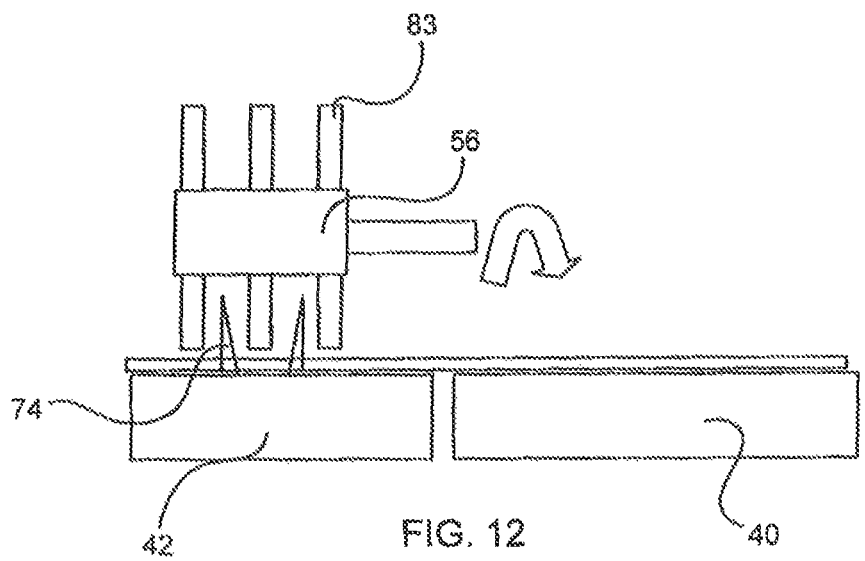
FIG. 12 illustrates a sectional side view of a circular needle loom with a wheel according to an embodiment.
Figure 13:
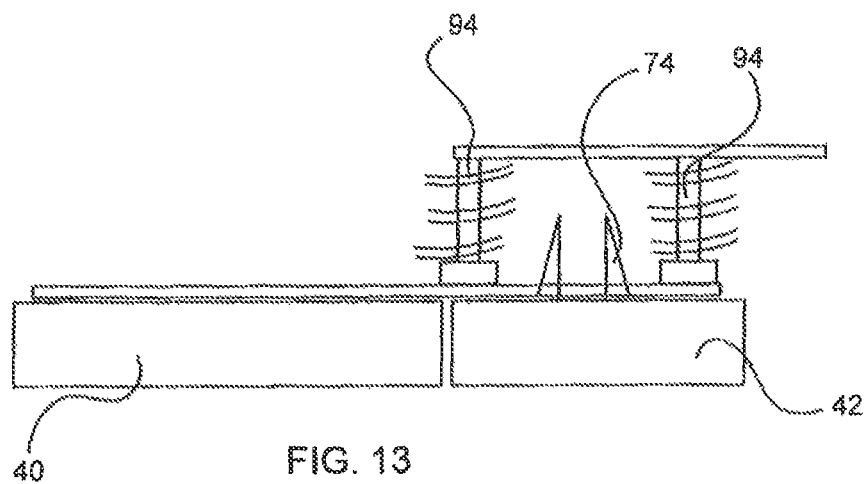
FIG. 13 illustrates a sectional side view of an outer rotating support of a circular needle loom with movable fingers to engage a textile in pins according to an embodiment.

In various embodiments, and with reference to FIGS. 11-13, a stationary bed plate 40 with outside support element 42 and inside support element 43 may facilitate layering and needling a spiral textile in needling zone 12. Spikes 74 placed along outside support element 42 and/or inside support element 43 interface with various positional structures disclosed herein, which are associated with the spiral textile.

A conical reel 110 may contain the fabric supply for the circular needle loom 10. The conical reel 110 may be placed substantially vertically above stationary bed plate 40 in a section located upstream of needling zone 12. In various embodiments, the spiral textile is unwound and placed on bed plate 40 and/or on previously needled layers of the textile. Once a predetermined length of the edges of the spiral textile is pinned to spikes 74, the rotational movement of outside support element 42 and inside support element 43 facilitate driving the textile around bed plate 40 and through needling zone 12. In an embodiment, the driving mechanism to unwind the fabric from reel 110 may be supplemented by an active conical roller 114 placed between reel 110 and needling zone 112, as illustrated in FIG. 11.

In various embodiments, and depending on the amount of textile stored on reel 110, the unwinding of the textile may be facilitated by a motorized shaft driving reel 110. The speed of the shaft may be coordinated with the speed of outside support element 42, inside support element 43, and/or any other mechanisms supporting the unwinding and transport of the spiral textile. Furthermore the conical roller may advantageously facilitate the initial positioning of the fabric, for example, by properly orienting the fabric and exerting a downward force on the fabric.

In various embodiments, mechanisms may be utilized to press the spiral textile over spikes 74 and/or to otherwise secure the spiral textile to rotational outside support element 42 and rotational inside support element 43. For example, and with reference to FIG. 13, engagement mechanisms such as pressing bars, fingers, and/or combs 94 may be positioned along sections of the inside and/or outside support elements to push the sacrificial edges of the spiral textile onto spikes 74. In an embodiment, and with reference to FIG. 12, rotating wheels 56 equipped with brushes and/or fingers 83 may be used to push the sacrificial edges into spikes 74. Further, in an embodiment, the shaft of the conical roller drives the conical roller and two additional wheels with bristles and/or fingers to apply pressure on the inner and/or outer edges of the textile.

It should be understood that, although fiber loops 29 and sacrificial edge 27 have been disclosed to facilitate securing a spiral textile to a bed plate or rotating the spiral textile over the bed plate, any structure may be utilized to secure or rotate the textile without departing from the scope of the present disclosure. For example, any positional structure that may be utilized to increase the efficiency and reduce the cost of manufacturing a needled preform is contemplated within the scope of the disclosure. Further, in various embodiments, one type of structure may be utilized on the OD of the textile, and the same or different structure may be utilized on the ID of the textile. Additionally, wheels, clamps, and/or combinations of the same may be utilized to facilitate securing and/or rotating the textile.

Further, it should be understood that any of the various mechanisms for moving the textile about the circular needle loom may be used in connection with a rotational and/or stationary bed plate. For example, a textile with loops 29 may be moved about a stationary bed plate by being clamped onto support elements located at the ID and/or OD of the bed plate. As the support elements rotate, the textile moves around the bed plate until a sufficient number of layers are created and needled. Any securing and/or entrainment mechanism disclosed herein may be used in combination with stationary bed plates, rotational bed plates, stationary support elements and/or rotational support elements to facilitate needling the spiral textile into a circular preform.

In connection with the systems and methods discussed above, a spiral textile may be needled into a needled preform in a more efficient manner that currently available in the prior art. For example, in accordance with various embodiments, a method for creating a circular preform from a spiral textile comprises weaving a weft tow from an inside diameter to an outside diameter of the spiral textile into a plurality of warp tows spaced between the inside diameter and the outside diameter. Sacrificial fibers are then co-woven or attached to the weft tow and/or and the plurality of warp tows, such that the sacrificial fibers are next to the inside diameter and/or the outside diameter of the spiral textile.

After the sacrificial fibers are incorporated into the spiral textile, the spiral textile is transported to a bed plate of a circular needle loom. The bed plate may be either stationary or movable as discussed above. The loom may engage a positional structure of the spiral textile, for example, by engaging a sacrificial structure such as a loop or a sacrificial edge with a wheel, clamp, spike, and the like. The loom then rotates the spiral textile around the circular needle loom until a predetermined number of layers of the spiral textile have been deposited on the bed plate. In a needling zone, the first two layers, and any subsequent layers, of the spiral textile are then needled to create the needled preform. In an embodiment, once a sufficient number of layers have been needled, the needled substructure becomes the securing and transport structure for the subsequent needled layers, and the engagement members may no longer be necessary. In various embodiments, the engagement mechanisms may be removed from the positional structure such that the needled preform may be efficiently removed from the loom. Further, in various embodiments, the sacrificial structure may be removed, for example, by burning (e.g., during a furnace process used for preparing the carbon brake disk) or cutting, in order to finalize the needled preform.

As noted above, existing reels, spools and other mechanisms for storing and deploying spiral textiles, for example, reels such as those illustrated by prior art FIG. 1, require substantial space and complex routing schemes to deploy the spiral textile on a circular needle loom in order to create a needled preform. Further, prior art mechanisms require substantial care in order to maintain the weave of the spiral textile. In order to address these and other deficiencies, and in accordance with various embodiments, a storage device such as a spool, reel and the like may be utilized to advantageously receive a spiral textile tape from a loom in a manner that more easily and efficiently maintains the shape and weave of the spiral textile tape with less distortion than prior art mechanisms. The tape may be prepared with a relatively loose weave such that various embodiments substantially minimize any distortion of the tape that would shift the fibers in the tape around.

In accordance with various embodiments, a spiral textile tape is transported from the loom where the spiral textile tape is created to another location. For example, a conical take off system may comprise a spool 110 that facilitates taking the spiral textile off of a narrow fabric needle loom after weaving the textile. The spiral textile tape may then be transported, for example, on spool 110, to a circular needle loom where the spiral textile tape is removed from spool 110, and then layered and needled into a preform of a selected geometry as discussed above.

Figure 14A:
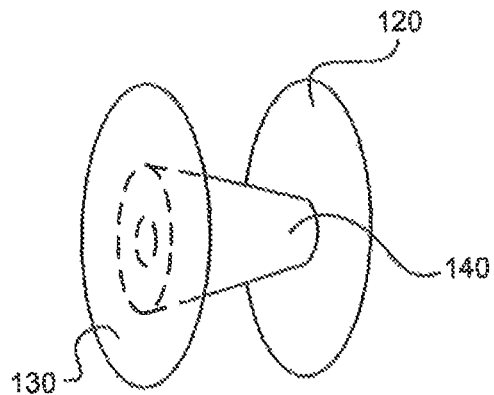
FIG. 14A illustrates a perspective view of a textile reel according to an embodiment.
Figure 14B:
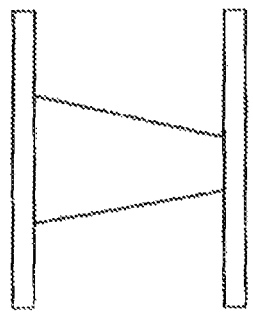
FIG. 14B illustrates a side view of a textile reel with a tapered barrel according to an embodiment.
Figure 14C:
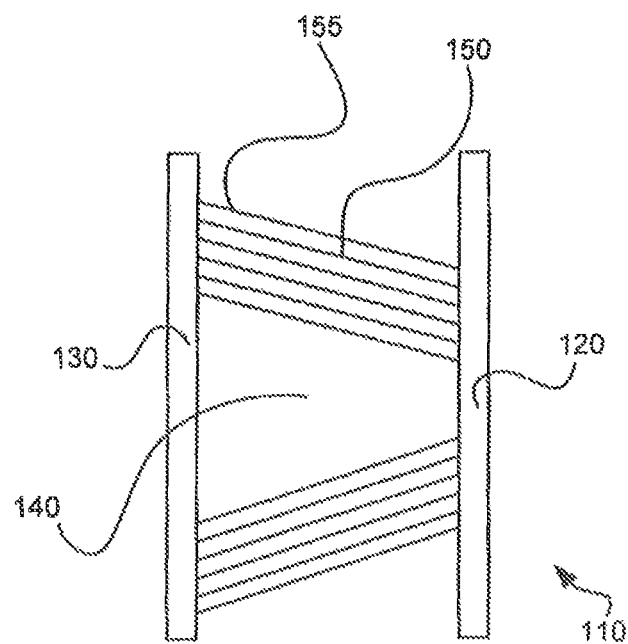
FIG. 14C illustrates a sectional side view of a textile reel with a spiral textile wound around a barrel of the textile reel.
Figure 15:
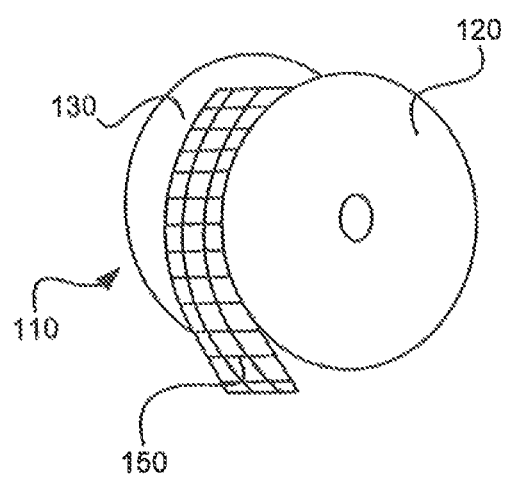
FIG. 15 illustrates a perspective view of a textile reel with a wound spiral textile according to an embodiment.

According to an embodiment, and with reference to FIGS. 14A-14C, a spool 110 facilitates substantially maintaining the shape and weave of a spiral textile tape 150 both when the textile 150 is wound around a barrel 140 of spool 110 as it is received from the first loom and as the textile tape is unwound from the spool 110 and layered in the second loom to create a circular preform.

For a textile having a straight shape—i.e., the textile lies in a straight line—a standard spool may be used to receive the textile from the first loom. For example, a standard spool may comprise a cylinder that receives the straight textile. However, a spiral textile tape according to various embodiments has a helical shape—i.e., when a spiral tape is flat, it falls in a circle and not a straight line. Therefore, a cylinder may not sufficiently receive a spiral textile tape without distorting the weave and/or shape of the spiral textile tape.

Thus, according to various embodiments, and with reference to FIG. 14C, a spool 110 that receives a spiral textile tape 150 comprises a substantially conical section 140. For example, a frustum of a cone may be disposed between two hubs 120, 130, and the frustum of a cone may receive the spiral textile 150. The frustum may have different characteristics depending on the curvature, inside diameter, outside diameter, weave or other structure or characteristic of the spiral textile. The spool 110 with the cone section 140 may maintain the overall geometry of the spiral tape 150 as well as the fiber orientation following weaving of the tape in the first loom. For example, the cone section 140 may be tapered such that the textile tape 150 may be wound around cone section 140 in a manner that orients a face 155 of textile 150 such that textile face 55 is substantially parallel to cone section 140.

According to an embodiment, each reel holds sufficient textile tape for at least a single preform. In this manner, less space is required to maintain the spiral textile tape near the circular needle loom, because the reel is sized appropriately for the preform that is being created. Also, limiting the storage to a single preform reduces distortion in the fabric that may occur when too many layers are wound on the reel. Further, segmenting the textile tape into individually-sized reels facilitates automation of the preform manufacturing process. For example, multiple reels may be loaded automatically or manually into a feed device proximate the circular needle room, and one reel may be loaded for each preform needling process. Additionally, in various embodiments, each reel may hold sufficient tape for a plurality of preforms, or multiple reels may be utilized for a single preform.

In accordance with an embodiment, substantially vertical reels 110 may be utilized to wind the spiral tape 150 from a narrow fabric needle loom. As the weaving process is progressing, the spiral tape 150 is wound from the narrow fabric needle loom onto conical barrel 140 of reel 110. Reel 110 may then be transported to a substantially vertical position above a circular bed plate of a needle punch loom and/or a circular needle loom. Such a method facilitates collecting, moving, and storing a woven spiral tape substantially without distortion and feeding the fabric in a more simplified path from the reel to the circular bed plate. Furthermore, with reference to FIG. 16, reel 110 may be located closer to circular needle loom 160 than prior art spiral textile storage mechanisms. For example, textile tape 150 is advantageously oriented on reel 110 so that it may be deployed and/or directly layered on circular needle loom 160 without reorienting textile tape 150. This configuration overcomes difficulties associated with prior art reels where the tape exits a reel and is then fed through a complex path to reorient the textile tape with respect to a circular needle loom.

In accordance with various embodiments, the textile tape may be routed from one reel to another, either manually or automatically (e.g., using a robot) during which process the tape may be cut, such as by "kiss-cutting," to facilitate cutting short fibers at the surface of tape to enable transfer of the short fibers in the z direction with respect to the tape. Such a cutting process is described in more detail in U.S. patent application Ser. No. 12/536,649 entitled, "Method And System For Enabling Z Fiber Transfer In Needled Preform" (filed on Aug. 6, 2009), the entirety of which is incorporated herein by reference. For example, a first reel may be located proximate a narrow fabric needle loom, and the textile may be wound around the first reel as the weaving process is progressing. Then the textile may be unwound from the first reel and wound around a second reel proximate the circular needle loom. The cutting may occur between the first reel and the second reel.

According to an embodiment, and with reference to FIGS. 14A-14C and 15, a reel 110 for a spiral textile 150 comprises opposing hubs 120 and 130 and a barrel 140 disposed between the hubs. Barrel 140 may be in the shape of a frustum of a cone. For example, the end of barrel 140 that is proximate hub 120 may comprise one diameter, and the end of barrel 140 that is proximate hub 130 may comprise a larger or smaller diameter. In various embodiments, barrel 140 may have any geometry that advantageously facilitates winding a spiral textile tape 150 about barrel 140 in a manner that maintains a weave and shape of the textile tape 50.

Figure 16:
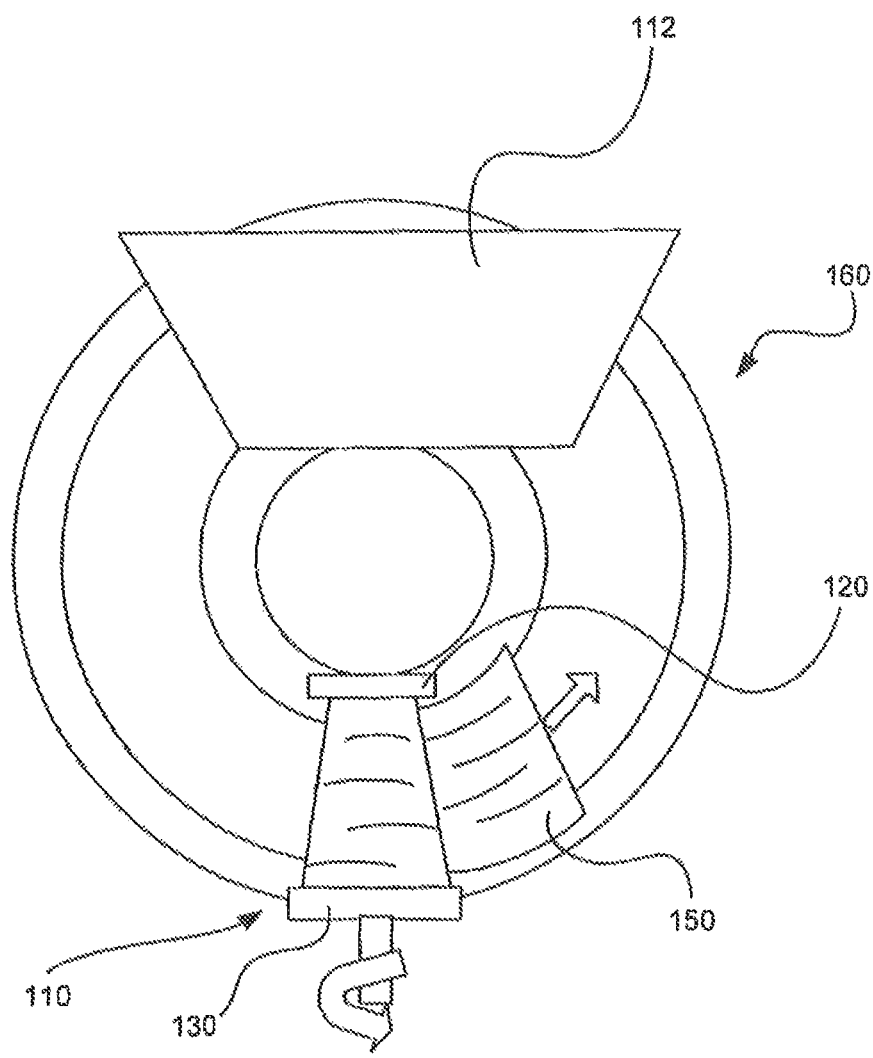
FIG. 16 illustrates a perspective view of textile reel with a wound spiral textile positioned proximate a circular needle loom according to an embodiment.

In an embodiment, and with reference also to FIG. 16, reel 110 may further facilitate unwinding textile 150 from barrel 140 onto a circular needle punch loom bed plate 160. Textile 150 includes a face 155 that is disposed in a substantially parallel manner to barrel 140. Bed plate 160 also receives face 155 of textile tape 150 in a substantially parallel fashion such that textile tape 150 lies substantially flat on bed plate 160. Because face 155 of textile tape 150 is substantially parallel to barrel 140 of reel 110 and to bed plate 160 of a circular needle punch loom, reel 110 may be disposed close to bed plate 160 and substantially vertically with respect to bed plate 160. This configuration facilitates reducing space required for routing textile tape 150 to bed plate 160. Further, such configurations overcome difficulties associated with prior art reels because reel 110 facilitates orienting textile tape 150 close to a circular needle loom because it is not necessary to reorient the textile tape prior to layering it on the circular needle loom.

Figure 17:
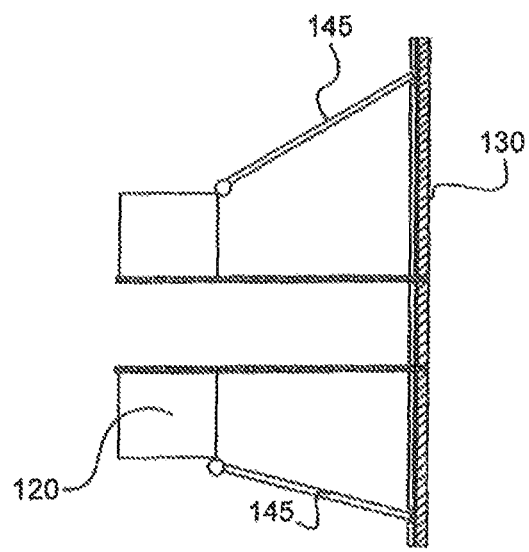
FIG. 17 illustrates a side view of a textile reel with articulated elements hinged to a hub according to an embodiment.
Figure 18A:
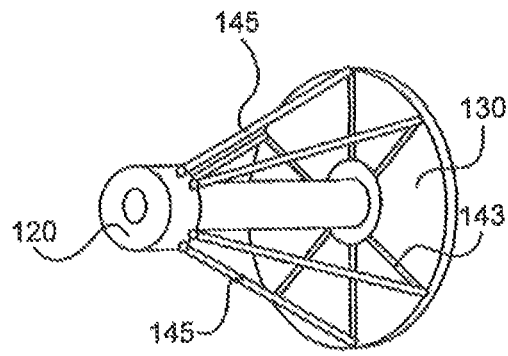
FIG. 18A illustrates a perspective view of a textile reel with articulated elements hinged to a first hub and disposed in radial elements of a second hub according to an embodiment.
Figure 18B:
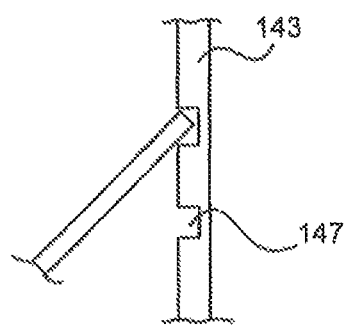
FIG. 18B illustrates a sectional view of an articulated element nesting at a second hub of the textile reel according to an embodiment.

In various embodiments, reel 110 advantageously winds and dispenses spiral textile tapes having different dimensions, such as ODs and IDs, different weaving patterns, and various other different characteristics. For example, with respect to FIGS. 17 and 18A-18B, reel 110 may be advantageously adaptable to different types of spiral tapes as discussed below.

According to an embodiment, reel 110 comprises a first hub 120, which includes a plurality of articulated elements 145 that are rotatably attached to and/or associated with first hub 120. Second hub 130 includes a plurality of radial elements 143 that extend from the center of second hub 130 to the outside of second hub 130. Radial elements 143 contain slots 147 that receive articulated elements 145. Radial elements 143 each include a plurality of slots 147 to advantageously provide a number of positions wherein articulated elements 145 may be located. Articulated elements 145 may be moved from one slot 147 to another slot 147 on radial element 143 in order to increase or decrease the angle of articulated element 147 with respect to first hub 120 and second hub 130.

Collectively, articulated elements 145 may function as barrel 140 (discussed above) about which a textile tape may be wound, stored, and then unwound. As such, articulated elements 145 may be referred to as barrel elements to describe the functionality of elements 145. Depending on the geometry, weave, composition and/or other characteristics of the spiral textile, barrel elements 145 may be moved from one slot 147 to another slot 147 to facilitate receiving the textile tape.

In accordance with various embodiments, any number of articulated elements 145, radial elements 143, and slots 147 may be utilized to accommodate a variety of textile types, shapes, geometries and the like. Collectively, articulated elements 145 may provide a surface upon which a spiral textile tape may be wound. For example, collectively, articulated elements 145 may form a substantially frusto-conical surface that receives the spiral textile tape. In an embodiment, articulated elements may form a triangle, square, pentagonal, octagonal and the like structures to receive the spiral textile in an orientation that facilitates directly deploying the spiral textile on a circular needle loom, without a need for reorienting the textile tape with respect to the circular needle loom.

Although this disclosure illustrates and describes various embodiments, equivalents and modifications will occur to others who are skilled in the art upon reading and understanding of the disclosure. Various embodiments include all such equivalents and modifications, and is limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for needling a spiral textile to create a needled preform, the method comprising:
   receiving the spiral textile on a bed plate of a circular needle loom;
   engaging a positional structure of the spiral textile;
   rotating the spiral textile around the circular needle loom;
   depositing a predetermined number of layers of the spiral textile on the bed plate;
   needling the spiral textile to create the needled preform: and
   removing the positional structure from the spiral textile.

2. The method of claim 1, wherein the positional structure is a sacrificial structure.

3. The method of claim 1, wherein the positional structure comprises a sacrificial edge.

4. The method of claim 3, wherein the positional structure further comprises a fiber loop.

5. The method of claim 1, wherein the engaging comprises engaging the positional structure with engagement members.

6. The method of claim 1, wherein the positional structure is located on at least one of an inner diameter and an outer diameter of the spiral textile.

7. A method for creating a circular needled preform from a spiral textile; comprising:
   weaving a weft tow from an inside diameter to an outside diameter of the spiral textile into a plurality of warp tows spaced between the inside diameter and the outside diameter;
   attaching sacrificial fibers to at least one of the weft tow and the plurality of warp tows proximate at least one of the inside diameter and the outside diameter;
   engaging the sacrificial fibers with an engagement mechanism on a circular needle loom;
   moving the spiral textile on the circular needle loom to deploy a predetermined number of layers of the spiral textile on the circular needle loom; and
   removing at least a portion of the sacrificial fibers after needling the spiral textile.

* * * * *